United States Patent
Aisaki et al.

(10) Patent No.: US 8,607,427 B2
(45) Date of Patent: Dec. 17, 2013

(54) POSITIONING DEVICE OF POSITION SENSOR

(75) Inventors: Hideki Aisaki, Tokyo (JP); Kazuyoshi Hirosaki, Tokyo (JP); Kouji Muraguchi, Tokyo (JP); Kouichi Honda, Tokyo (JP); Seiji Tanizaki, Tokyo (JP)

(73) Assignee: Honda Motor Co. Ltd., Tokyo (JP)

( * ) Notice: Subject to any disclaimer, the term of this patent is extended or adjusted under 35 U.S.C. 154(b) by 719 days.

(21) Appl. No.: 12/811,128

(22) PCT Filed: Dec. 25, 2008

(86) PCT No.: PCT/JP2008/073534
§ 371 (c)(1),
(2), (4) Date: Jun. 29, 2010

(87) PCT Pub. No.: WO2009/084564
PCT Pub. Date: Jul. 9, 2009

(65) Prior Publication Data
US 2010/0281667 A1  Nov. 11, 2010

(30) Foreign Application Priority Data
Dec. 30, 2007  (JP) .................................. 2007-341579

(51) Int. Cl.
*B23P 11/00* (2006.01)
(52) U.S. Cl.
USPC ........................................ 29/281.1; 29/281.5
(58) Field of Classification Search
USPC ............ 29/281.1, 281.3, 281.4, 281.5; 451/8, 451/41, 28, 285; 269/37, 289 R, 903, 329
See application file for complete search history.

(56) References Cited

U.S. PATENT DOCUMENTS

| | | | |
|---|---|---|---|
| 6,390,894 B1 * | 5/2002 | Beel et al. ........................ | 451/47 |
| 6,637,737 B1 * | 10/2003 | Beecherl et al. ................ | 269/71 |
| 6,752,694 B2 * | 6/2004 | Schneegans et al. ............ | 451/8 |
| 8,132,802 B2 * | 3/2012 | Kolodge et al. ................ | 269/275 |
| 8,215,623 B2 * | 7/2012 | Bradsher ......................... | 269/37 |
| 8,322,698 B2 * | 12/2012 | Bretschneider et al. ........ | 269/86 |
| 2010/0281667 A1 * | 11/2010 | Aisaki et al. .................. | 29/281.1 |

FOREIGN PATENT DOCUMENTS

| | | |
|---|---|---|
| JP | 7-310823 | 11/1995 |
| JP | 08074978 | 3/1996 |
| JP | 2000-318475 | 11/2000 |
| JP | 2002-120587 | 4/2002 |
| JP | 2003-063267 | 3/2008 |

* cited by examiner

Primary Examiner — Lee D Wilson
(74) Attorney, Agent, or Firm — Rankin, Hill & Clark LLP (57) ABSTRACT

A positioning device of a position sensor that does not require re-positioning and re-fastening at the time of mounting the position sensor. A positioning tool provided with a driving section and a positioning section is mounted on a position sensor. Then, positioning projections of the positioning section are engaged with neutral position grooves. In this state, the positioning section is rotated by the driving section so as to have the position sensor rotated together until the R-contact turns ON, so that an angle from N to R, i.e. from a neutral position to a reverse contact ON position is measured. Thereafter, the positioning section is rotated in an opposite direction to measure an angle from N to D, i.e. from a reverse contact OFF position to a drive contact ON position. Based on the measurement result, the positioning section is re-rotated by the driving section to move the position sensor to a proper neutral position. The position sensor is fastened in this condition.

5 Claims, 11 Drawing Sheets

Prior Art

POSITIONING DEVICE OF POSITION SENSOR

BACKGROUND OF THE INVENTION

1. Field of the Invention

The present invention relates to a device for performing proper positioning when mounting a position sensor for an automatic transmission for automobiles or the like.

2. Description of the Related Art

A conventional position sensor for an automatic transmission has a change shaft which is interlocked with a shift lever. When the change shaft is rotated, a rotor within the position sensor is rotated so as to mechanically switch a connection of contacts between a moving contact and a plurality of fixed contacts which are previously provided corresponding to the number of shift positions. Then, the shift position is detected in accordance with a rotation angle when the rotor is rotated from a neutral position. (This system is called a switch type sensor.)

Accordingly, it is necessary to properly position the neutral position of the position sensor when mounted. Therefore, the position sensor is mounted with a positioning tool, for example.

Further, there are examples that reduce the number of the contacts by using a potentiometer (for example, see patent references 1 and 2).

Patent reference 1: Japanese patent laid-open publication No. H07-310823A.

Patent reference 2: Japanese patent laid-open publication No. 2002-120587A.

Figure 11:
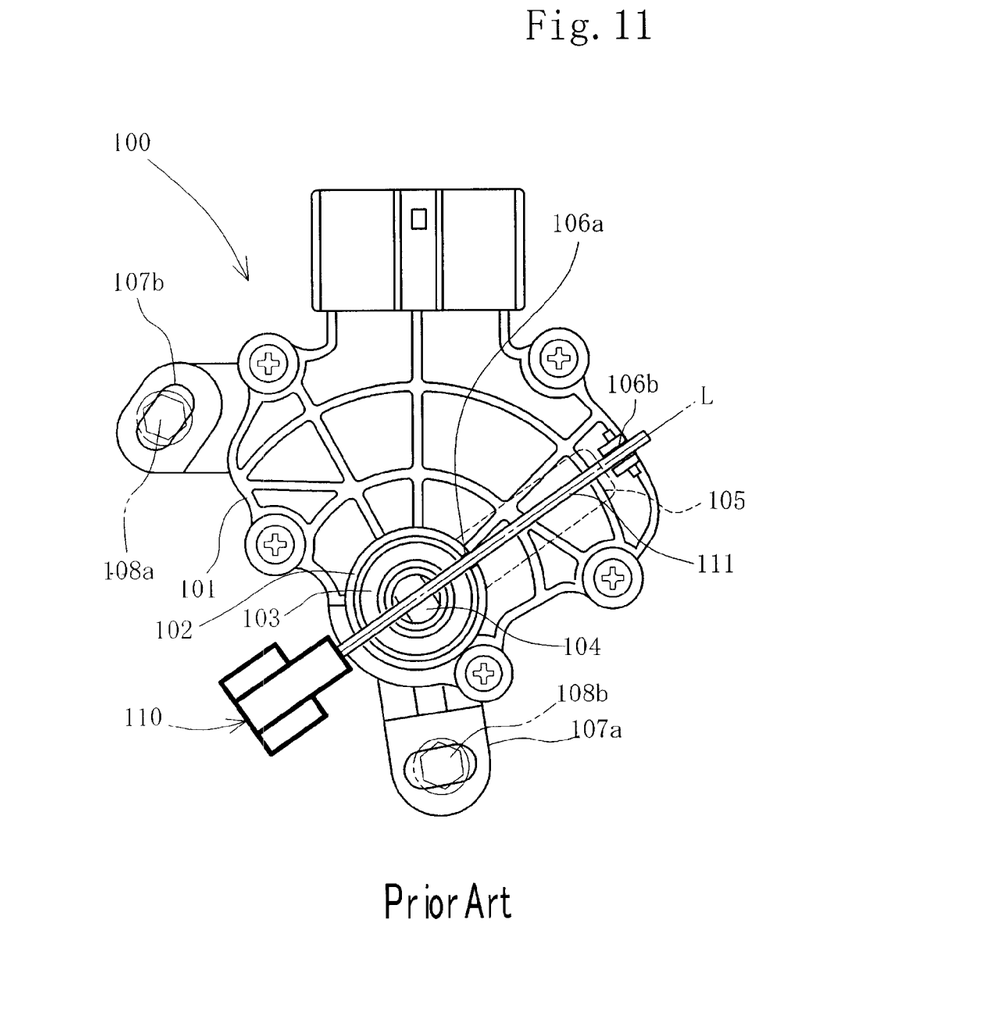
FIG. 11 is a view showing a conventional positioning method.

FIG. 11 is a view showing the positioning performed with the conventional positioning tool. A position sensor 100 is substantially in the shape of a fan. On a pivot portion of a casing 101 there is provided a boss 102 into which a hollow rotor shaft 103 is rotatably inserted. A change shaft 104 which is inserted into the rotor shaft 103 is fixedly fitted to the inside of the rotor shaft 103 in an integrally rotatable fashion. When the change shaft 104 is rotated, the rotor shaft 103 is integrally rotated and also a rotor 105 integrated with the rotor shaft 103 is rotated in the inside of the position sensor 100. Then, a moving contact provided on the rotor 105 comes into contact with a plurality of fixed contacts which are previously arranged on the same arc in accordance with each of the shift position, so that the shift position is switched in turn.

Each of the fixed contacts is arranged at a rotation angle using a neutral position of the rotor shaft 103 as the reference. This neutral position is properly positioned with a positioning tool 110 when the position sensor 100 is mounted on an automatic transmission (not shown).

The positioning tool 110 is provided with a positioning section 111. The positioning section 111 extends straight along a positioning reference line "L" which connects a rotation center of the rotor shaft and the moving contact and which is a straight line in the neutral position. The positioning section 111 is fitted into positioning grooves 106a, 106b formed on a surface of the casing 101, so that the position sensor 100 is positioned. Then, when mounting bosses 107a, 107b provided on two outer peripheral locations of the casing 101 are mounted by bolts 108a, 108b on the automatic transmission, the position sensor 100 is mounted on the automatic transmission in such a state that the neutral position is properly positioned.

In the above referred example using the potentiometer, the sensor is specialized in construction thereby to become complicated and expensive. Therefore, from the perspective of cost or the like, there are cases where it is desired to use the above referred switch type sensor. In the case of the switch type sensor, however, the high accuracy positioning of the neutral position is required at the time of mounting, and also it is necessary to check an electrical connection and to ensure an angle after mounting so that it takes much time and effort. This will be explained hereunder.

Figure 8:
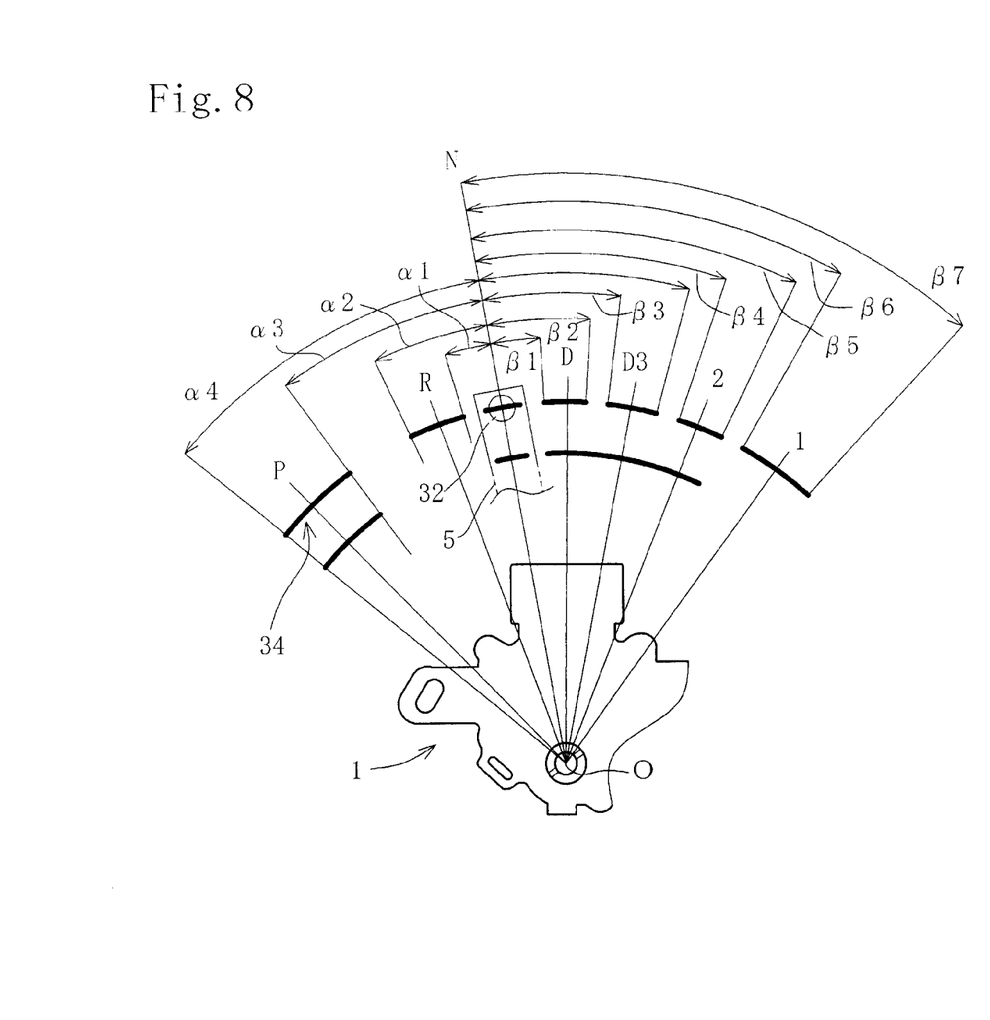
FIG. 8 is a view showing the arrangement of fixed contacts.

As shown in FIG. 8, each of the shift positions is arranged in the order of a parking position "P", a reverse position "R", a neutral position "N", a drive position "D", a fixed third speed position "D3", a second position 2 and a low position 1. Fixed contacts corresponding to each of the shift positions are arranged on concentric circular arcs of a rotor shaft 103 and a change shaft 102 which have the common center "O". The shift position is located on a central position of each of the fixed contacts. In the following explanation, reference characters of the shift positions are used with respect to the shift position (the central position of the fixed contact) and each of the fixed contacts.

Each of the fixed contacts is arranged at a predetermined angle with respect to the center (N-position) of an N-contact as the reference (0°). The angle from this N-position to each of the shift positions will be called a contact angle. Moreover, since the rotor shaft 103 and the change shaft 102 are integrally rotated such that the rotation of the rotor 105 causes the simultaneous rotation of the rotor shat 103 and the change shaft 102, such integral rotation will be called simply the rotation of the change shaft 102, in the following explanation.

Since at the time of mounting the position sensor 100, an electrical connection checking and an angle ensuring are not performed, the operation for the electrical connection checking and the angle ensuring is required after mounting. The electrical connection checking is performed for checking whether or not there is an electrical connection in each of the positions so as to detect whether or not there is anything unusual in the fixed contacts. On the other hand, the angle ensuring is performed for ensuring that, when shifted to the R-position or the D-position, the angle from the N-contact to an ON position of an R-contact or from the N-contact to an ON position of a D-contact falls within a predetermined range.

At first, when the change shaft 102 is rotated from the N-position to the P-position, whether there is the electrical connection at each of the P-position and the R-position is checked, and at the same time an angle $\alpha 1$ from an OFF position of the N-contact to the ON position of the R-contact is detected.

Next, when the change shaft 102 is rotated from the P-position to the 1-position in an opposite direction, the electrical connection is checked at each of the positions, and at the same time an angle $\beta 1$ from the OFF position of the N-contact to the ON position of the D-contact is detected.

For positioning the position sensor 100, the N-position must be accurately fixed. For example, the angles $\alpha 1$ and $\beta 1$ each require high accuracy and must be ensured within a predetermined tolerance of the order of $\frac{1}{10}°$.

However, in the case where such high accuracy angle ensuring is required, the positioning method by the above positioning tool 100 takes much time and effort. Namely, when mounting the position sensor 100 while positioning it with the positioning tool 110, the setting of the positioning tool 110 is controlled by experience and skill or sense of the operator and a certain amount of variation exists in the setting operation, so that a certain amount of variation beyond the tolerance of the angle ensuring is unavoidably produced. Therefore, the additional operation for the electrical connection checking and the angle ensuring is required after the position sensor 100 is mounted. Moreover, in the case where the variation beyond the tolerance of the angle ensuring as above is produced, the bolts 108a, 108b are loosened once and fastened again while re-positioning the position sensor 100 with the positioning tool, and under certain circumstances this operation may be repeated several times.

Therefore, the present invention aims to make it possible to determine the neutral position in such a state that the angle is ensured before mounting the position sensor.

SUMMARY OF THE INVENTION

To solve the above mentioned problems, the present invention according to claim 1 relates to a positioning device of a position sensor for an automatic transmission in which in accordance with a rotation angle of a rotor a moving contact of the rotor switches contact with a plurality of fixed contacts corresponding to each of the shift positions, and is directed to a device for positioning the position sensor in a neutral position, comprising a positioning section for performing the positioning of the position sensor, a driving section for rotating the position sensor through the positioning section, a rotation angle detecting section for detecting a rotation angle of the position sensor, and a controlling section for controlling an operation of the driving section, wherein the driving section is operated to rotate the position sensor which is positioned in the positioning section in a state of stopping the rotation of the rotor, the rotation angle detecting section detects a rotation angle from a neutral position to a predetermined position of a neighboring shift position, the controlling section calculates, based on this detected value, an angle of a proper neutral position, and the driving section is re-operated to rotate and correct the position sensor to the proper neutral position.

The invention of claim 2 is directed to a positioning device of a position sensor according to claim 1 wherein the driving section comprises a servo motor, a speed reducing section for reducing a rotation output of the servo motor, a driving shaft to which the driving force from the speed reducing section is transmitted, a brake section for braking the rotation of the driving shaft, and the rotation angle detecting section.

The invention of claim 3 is directed to a positioning device of a position sensor according to claim 2 wherein the speed reducing section comprises a harmonic drive gearing.

The invention of claim 4 is directed to a positioning device of a position sensor according to claim 1 wherein the positioning section has a positioning projection or groove to be engaged with the position sensor.

The invention of claim 5 is directed to a positioning device of a position sensor according to claim 1 wherein the position sensor is rotated from the neutral position to one of a reverse position and a drive position which neighbor the neutral position on right and left sides thereof, to measure a rotation angle from the neutral position to a contact ON position, and then it is rotated from the neutral position to the other of the reverse position and the drive position so as to measure a rotation angle from the neutral position to a contact ON position, so that a calculation of the proper neutral position and an angle ensuring between the neutral position and each of the reverse position and the drive position are performed simultaneously.

According to the invention of claim 1, the rotation angle between the contacts is actually measured before mounting by the positioning device thereby to determine a proper neutral position, and the position sensor is properly positioned through the corrected rotation before it is mounted. Therefore, at the time of mounting, the proper positioning of the neutral position is already carried out, and at the same time the angle is ensured. Thus, the angle ensuring operation after mounting is not required and no mounting operation is repeated, so that working efficiency may be improved.

According to the invention of claim 2, the driving section comprises the servo motor, the speed reducing section, the driving shaft, the braking section and the rotation angle detecting section. Therefore, it is possible to arrange each of the component sections excepting the driving shaft in the axial direction of the driving shaft whereby the device may be compact. Further, when using the servo motor fitted with a brake, the rotation angle may be adjusted with high accuracy.

According to the invention of claim 3, since the speed reducing section comprises the harmonic drive gearing, the rotation angle is able to be adjusted with higher accuracy and in addition, it is possible to make the device smaller and more lightweight.

According to the invention of claim 4, since the positioning projection or groove is provided in the positioning section, the position sensor is able to be positioned substantially in the neutral position through engagement with the positioning projection or groove, and further, the position sensor, when being rotated, may perform the proper positioning.

According to the invention of claim 5, the position sensor is rotated from the neutral position to one of the reverse position and the drive position thereby measuring the rotation angle to the ON position of the contact, and then it is rotated in an opposite direction thereby measuring a rotation angle to the ON position of the contact on the other side, so that the proper neutral position may be calculated by actual measurement, and the angle ensuring between the neutral position and each of the reverse position and the drive position may be performed simultaneously.

DETAILED DESCRIPTION OF THE PREFERRED EMBODIMENT

Figure 1:
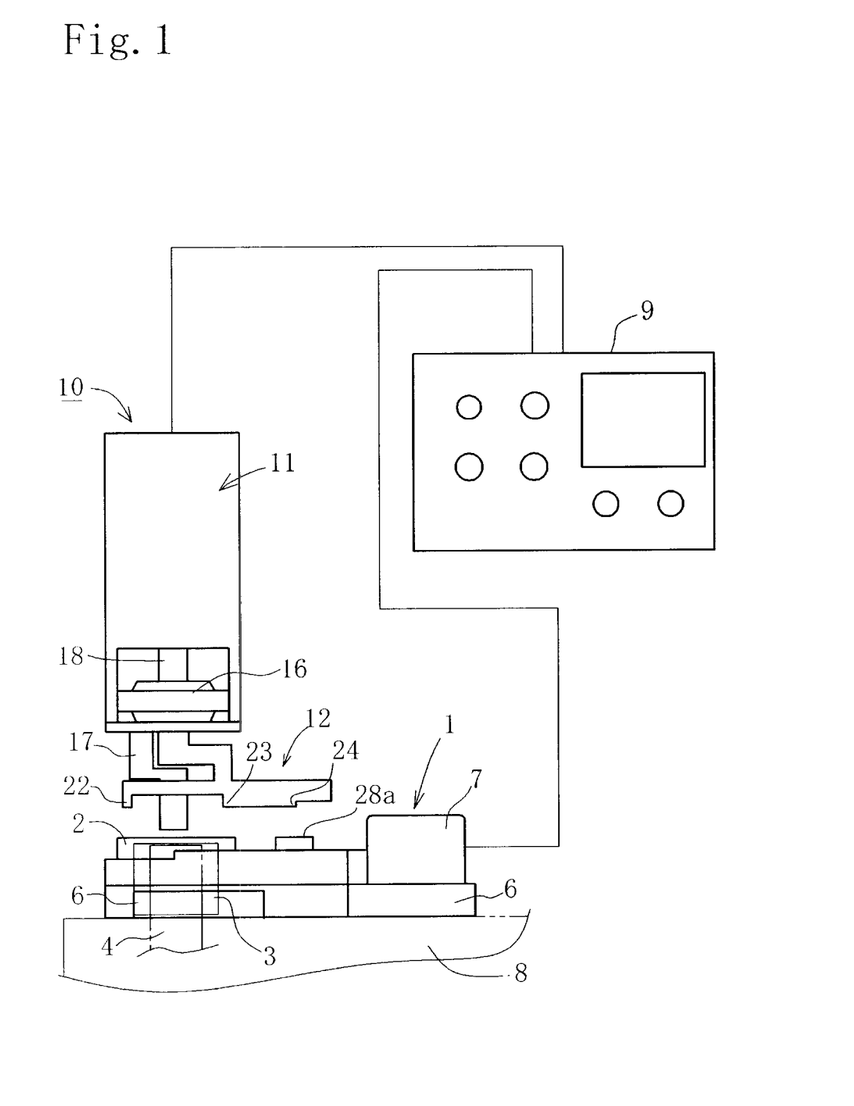
FIG. 1 is a perspective view of a positioning tool.

Embodiments of the present invention will be explained hereunder with reference to accompanying drawings. FIG. 1 is a view schematically showing the whole of a positioning device. A positioning tool 10 is a substantially cylindrical shape extending in an upward and downward direction and has a driving section 11 at the lower end of which a positioning section 12 is located. The positioning section 12 positions a position sensor 1 in a neutral position. The position sensor 1 is disposed on a predetermined location of an automatic transmission 8. A change shaft 4 of the automatic transmission 8 is previously fitted into the position sensor 1 (see FIG. 7). The positioning tool 10 is connected to a controlling section 9 such that the operation of the positioning tool 10 is controlled by a control signal of the controlling section 9. A coupler 7 of the position sensor 1 is also connected to the controlling section 9 so as to send a position signal from the position sensor 1 to the controlling section 9.

Figure 2:
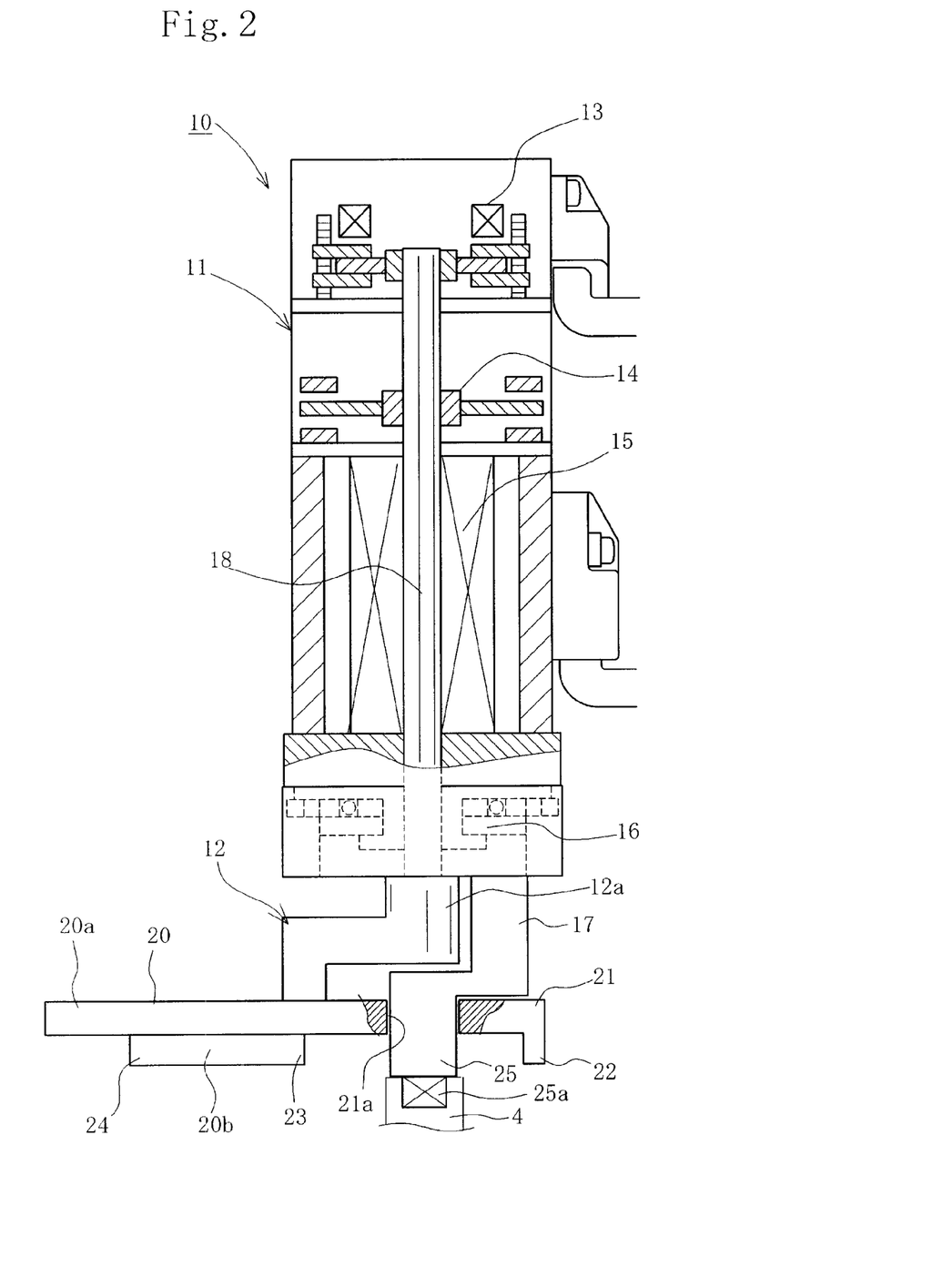
FIG. 2 is a cross sectional view of the positioning tool.

FIG. 2 is a cross sectional view of the positioning tool 10. The driving section 11 has a brake section 13, an encoder section 14, a servo motor 15 and a speed reducing section 16 in order from the top thereof. A driving shaft 18 passes through an axial center of the driving section 11 in the upward and downward direction. A lower portion of the driving section 11 is connected to the positioning section 12. A reference character 17 denotes a rotor fixing section.

The brake section 13 comprises a brake disc 20 which is located on an upper end of the driving shaft 18 and a braking plate 21 for holding and braking the brake disc 20. The braking plate 21 is operated by an actuator 22. The brake section 13, the encoder section 14, the servo motor 15 and the speed reducing section 16 are arranged in order along the driving shaft 18 so as to make the whole compact and lightweight.

The encoder section 14 corresponds to a rotation angle detecting section of the present invention. The rotation angle is detected in such a manner that the rotation of a sensor disc 23 provided integral with the driving shaft 18 is detected by a rotation sensor 24. As the detection system it is possible to adopt various kinds of publicly known systems such as slits provided at regular intervals in the circumferential direction of the sensor disc 23 to detect a change of magnetic force or the like, for example.

The servo motor 15 is a publicly known servo motor which outputs the rotation driving force for freely rotating in normal and reverse directions. The rotation output power is transmitted to the speed reducing section 16. Especially, when the servo motor 15 with a brake is adopted, it is possible to obtain a rotation angle of higher accuracy. Further, when using at the same time the speed reducing section 16 of a harmonic drive gearing type as referred to later, the high accuracy angle adjustment and positioning at the resolution of 0.01° order are able to be obtained, and in addition, the whole of the driving section 11 may become compact and lightweight.

The speed reducing section 16 comprises a harmonic drive gearing and is adapted to reduce the rotation output power of the servo motor 15 so as to rotate the driving shaft 18 at reduction speed. The harmonic drive gearing has a high reduction gear ratio and works at high accuracy without backlash. Moreover, it is simple in construction so that this section may become compact and lightweight. However, other publicly known speed reduction systems may be used according to circumstances.

The rotor fixing section 17 is formed integral with a casing of the driving section 11 and does not rotate different from other components in the positioning section 12. The rotor fixing section 17 extends downward from a lower end of the casing of the driving section 11 in the vicinity of an outer circumference thereof. The rotor fixing section 17 is bent at an intermediate portion thereof so as to extend downward along an imaginary extension of an axis of the driving shaft 18 and is fitted into an upper end of the change shaft 4 which is located coaxial with the driving shaft 18, so that the change shaft 4 is fixed in position not to be rotated.

A lower end of the driving shaft 18 is connected to the positioning section 12 around a lower end of the speed reducing section 16. The positioning section 12 comprises a shaft portion 12a bent in the shape of a crank and a plate 20 to which a lower end of the shaft portion 12a is connected. The positioning section 12 rotates integral with the driving shaft 18 around the central axis of the driving shaft 18. By the way, since the rotor fixing section 17 is also bent in the shape of a crank to have the lower end 25 thereof located coaxial with the driving shaft 18, the shaft portion 12a of the positioning section 12 is bent so as not to interfere with the rotor fixing section 17. The connected portion between the shaft portion 12a and the plate portion 20 is off the axis of the driving shaft 18. On the axis of the driving shaft 18 there is located the lower end 25 of the rotor fixing section 17.

The plate portion 20 is a substantially horizontally extended plate-shaped member. A straightly projecting indicator portion 20a is provided on one end side of the plate portion 20. A downwardly projecting rib 20b is formed integral with a bottom surface of the plate portion 20. A circular portion 21 overlapping an upper end of the boss 2 is formed on the other end side of the plate portion 20. On a partial bottom surface of the circular portion 21, downwardly extending positioning projections 22, 23 are formed integral with the circular portion 21. Also on an outside position of the boss 2 there is provided a positioning projection 24. This positioning projection 24 and the positioning projection 23 are formed apart from each other on opposite ends in a longitudinal direction of the rib 20b.

The lower end 25 of the rotor fixing section 17 passes through a center of the circular portion 21 so as to project in the downward direction. This lower end 25 has a further downwardly extending engaging projection 25a. The engaging projection 25a is engaged on the upper end of the change shaft 4 so that the change shaft 4 is connected and fixed to the positioning tool 10 so as not to be rotated. In this condition, the position sensor 1 is able to be rotated around the lower end 25 through the positioning section 12 by the driving shaft 18.

Figure 3:
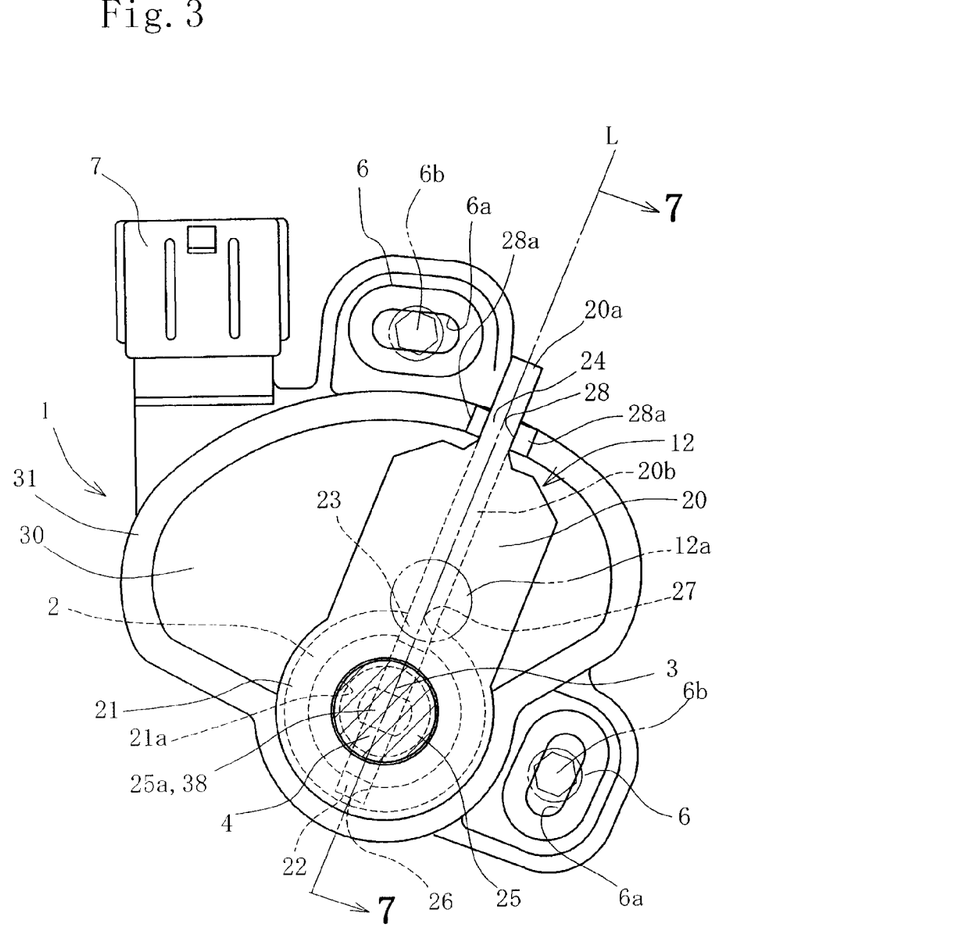
FIG. 3 is a top plan view of a coupled region in a state of being mounted on a position sensor.
Figure 4:
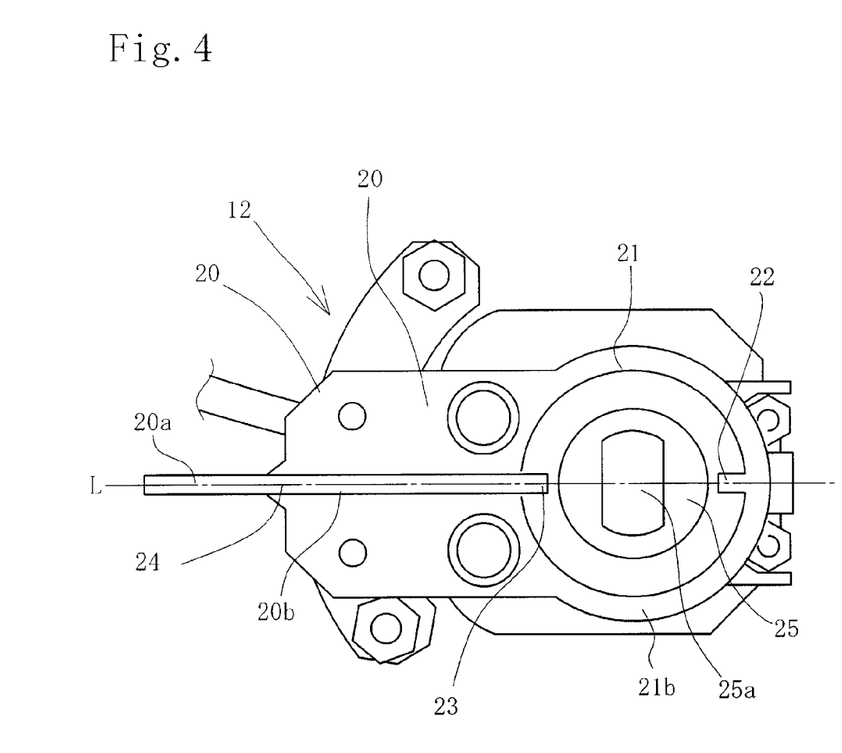
FIG. 4 is a bottom plan view of the coupled region.

FIG. 3 is a top plan view of the positioning section 12 in a state of being mounted on the position sensor 1, and FIG. 4 is a bottom plan view of the positioning section 12. First, an outline of the position sensor 1 will be explained with reference to FIG. 3. The position sensor 1 has a substantially similar construction to the conventional example shown in FIG. 1, and comprises a fan-shaped casing 30 and a lid 31 for covering the casing 30. On an outer periphery of the casing 30 there are integrally formed two outwardly extending mounting protrusions 6. An oblong hole 6a is provided on each of the mounting protrusions 6 so that the position sensor 1 is mounted on the transmission 8 (see FIG. 8) through a bolt 6b while adjusting its mounting location. A reference character 7 is a coupler for outputting to a controlling section 9 a position signal which is generated by switching contacts within the position sensor 1 through the rotation of the change shaft 4.

Next, the positioning section 12 will be explained with reference to FIG. 3 and FIG. 4. The circular portion 21 is so formed as to cover the boss 2 and has a through hole 21a at the center thereof. The lower end 25 of the rotor fixing section 17 is inserted into the through hole 21a. Therefore, the positioning section 12 is able to be rotated around the lower end 25.

An intermediate portion of the plate portion 20 has a little narrower width than the circular portion 21 and extends above the position sensor 1 to the outer peripheral side of the position sensor 1. Further, a tip of the plate portion 20 forms the indicator portion 20a and is narrowed to project out of the position sensor 1.

As clearly shown in FIG. 4, on the bottom surface of the plate portion 20, the positioning projections 22~24 are formed along a positioning reference line "L" corresponding to an imaginary straight line extending across a diameter of the circular portion 21 and passing the indicator portion 20a. Each of the positioning projections 23, 24 is provided as a portion of the rib 20b projecting from the bottom surface of the plate portion 20. The rib 20b is continued to the indicator portion 20a and narrowed in a similar way to the indicator portion 20a to extend along the positioning reference line "L" so that an end of the rib 20b reaches a seat portion 21b of the circular portion 21.

The seat portion 21b is a ring-shaped portion surrounding the through hole 21a and is in contact with the upper end surface of the boss 2. On the positioning reference line "L" in the seat portion 21b, the positioning projections 22 and 23 are provided in opposite positions relative to the center of the through hole 21a.

The positioning reference line "L" is for positioning the position sensor 1 in the neutral position when mounting the position sensor 1. When the positioning projections 22~24 located on the reference line "L" are fitted into each of positioning grooves 26~28 (see FIG. 5 and FIG. 6) of the position sensor 1, the position sensor 1 is arranged in the neutral position.

Figure 5:
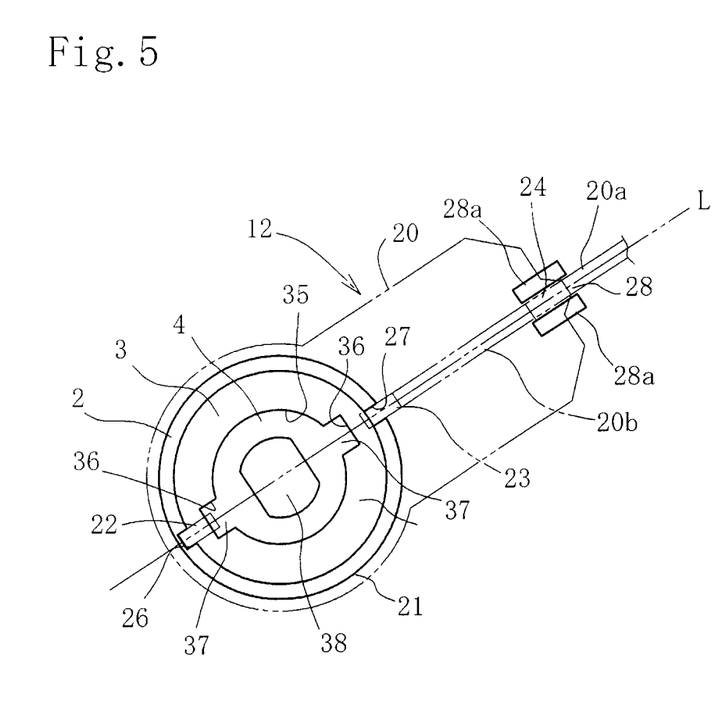
FIG. 5 is a schematic view showing positioning grooves.
Figure 6:
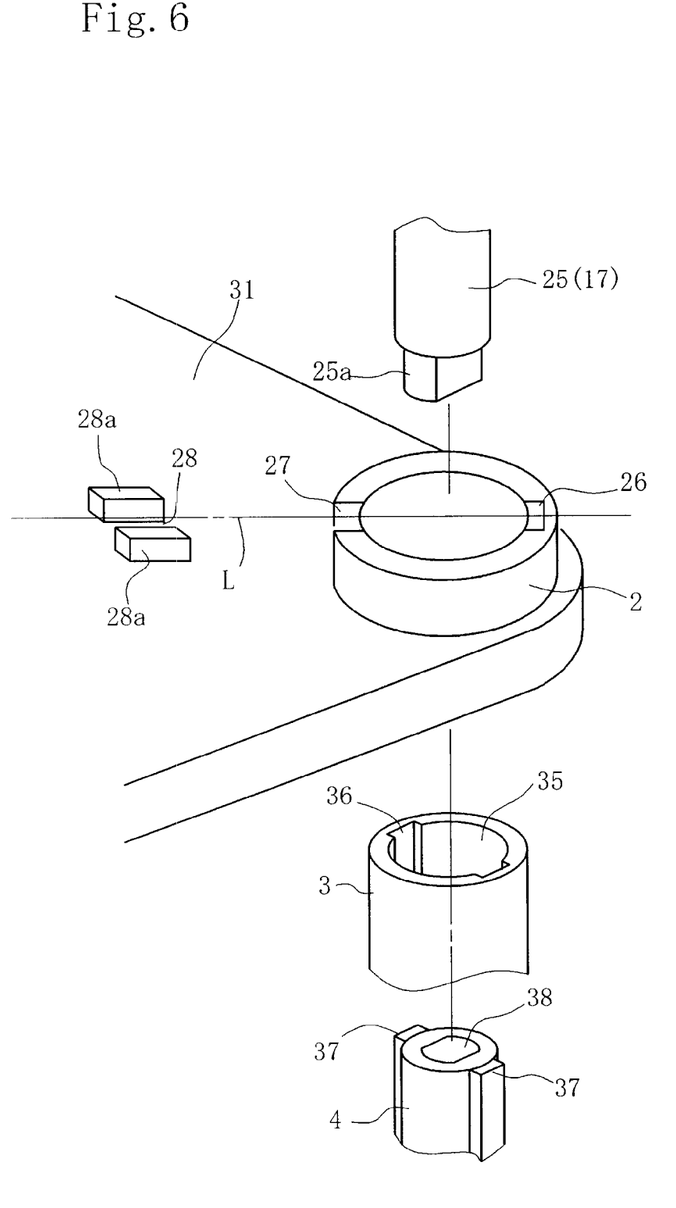
FIG. 6 is an explanatory view relating to the construction around a boss.

FIG. 5 is a schematic view showing the arrangement of the positioning grooves 26~28, and FIG. 6 is a view schematically showing the boss 2 and its environment. As shown in these drawings, the positioning grooves 26~28 are arranged in a straight line along the positioning reference line "L", wherein the positioning grooves 26, 27 are formed in the shape of a cutting groove (see FIG. 6) each corresponding to the positioning projections 22, 23 so that the positioning projection 22 comes in engagement with the positioning groove 26 while the positioning projection 23 comes in engagement with the positioning groove 27. The positioning groove 28 is provided between a pair of opposed projections 28a, 28a which is formed integral with the outer periphery of the lid 31, and the positioning projection 24 comes in engagement with the positioning groove 28.

Like the above, when each of the positioning projections 22~24 is fitted into each of the corresponding positioning grooves 26~28, the position sensor 1 is adjusted substantially to the neutral position by the positioning section 12 and, in this condition, set on the automatic transmission 8. Then, the oblong hole 6a of each of the mounting protrusions 6 is located on a nut portion (not shown) formed on a mounting seat of the automatic transmission 8 (see FIG. 3).

Next, the detailed construction of the position sensor 1 will be explained hereunder. Referring first to FIG. 6, a hollow rotor shaft 3 is rotatably inserted into the boss 2, and similarly, the change shaft 4 is inserted into the rotor shaft 3 upwardly in the drawing. The rotor shaft 3 is made of resin. On the inside circular wall of the rotor shaft 3 defining an axial hole 35, a pair of engaging grooves 36 extends in parallel in the axial direction. On an outer periphery of the change shaft 4, a pair of engaging projections 37 is provided to extend in parallel in the axial direction of the change shaft 4. The engaging projections 37 are engaged with the engaging grooves 36 so as to make the rotor shaft 3 and the change shaft 4 integrally rotatable.

An angular opening 38 is provided on a top portion of the change shaft 4. The engaging projection 25a of angular cross section which axially projects on the tip of the lower end 25 of the rotor fixing section 17 is inserted from the upper side of the rotor shaft 3 and engaged into the angular opening 38. The rotor fixing section 17 is mounted on the casing of the positioning tool 10 and does not move at the time of adjusting the positioning so that it holds the change shaft 4 immovable. Therefore, when performing the adjustment of the positioning, the position sensor 1 is rotated around the change shaft 4 through the positioning section 12 by the driving shaft 18.

Figure 7:
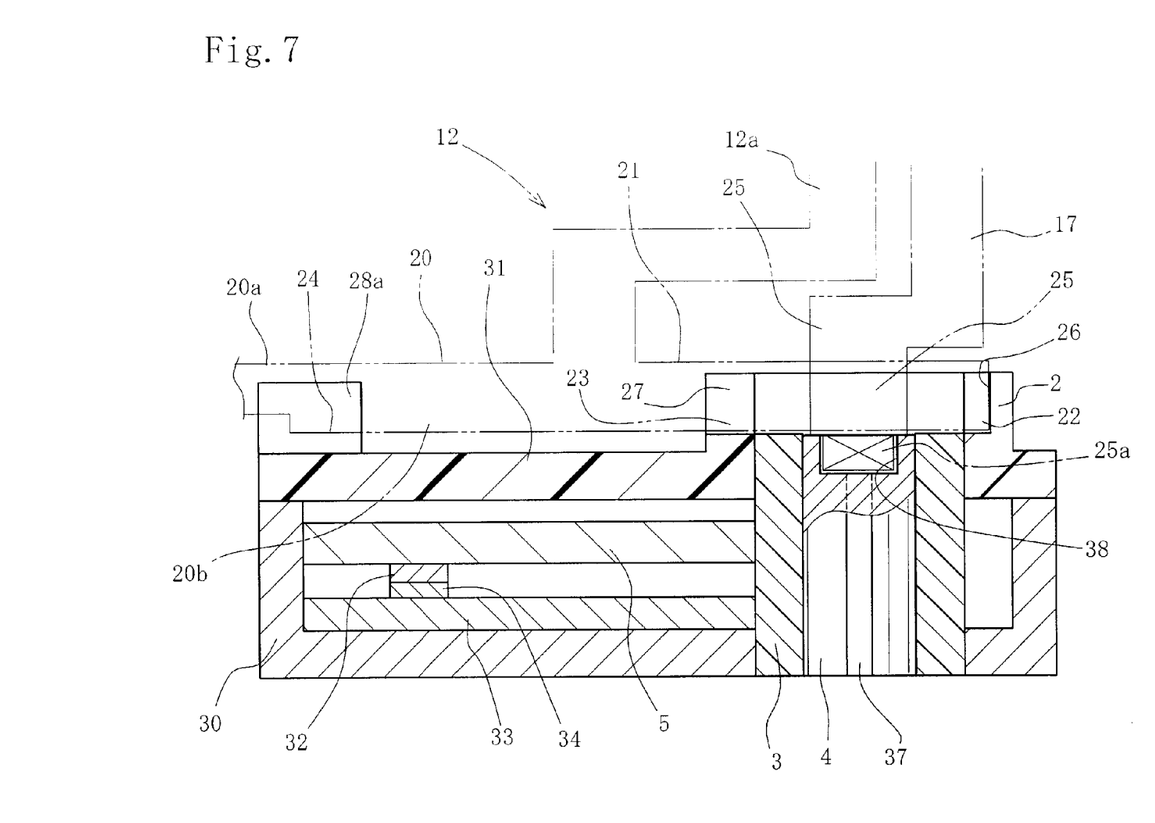
FIG. 7 is a schematic cross sectional view of the position sensor.

FIG. 7 is a schematic cross sectional view of the position sensor 1 taken along line 7-7 of FIG. 3. The position sensor 1 has the fan-shaped upwardly open casing 30 and the lid 31 for covering the opening of the casing 31. The boss 2 is located on a pivot position of the fan-shaped lid 31.

The rotor shaft 3 passes through the boss 2 and the casing 30. The rotor shaft 3 is formed integral with the rotor 5, and when the rotor shaft 3 is rotated, the rotor 5 is rotated integrally so that a moving contact 32 provided on the rotor 5 is adapted to switch contact with each of fixed contacts 34 provided on a board 33 within the casing 30.

Into the boss 2, the hollow rotor shaft 3 is rotatably inserted and the change shaft 4 inserted into the rotor shaft 3 is fitted to rotate integral with the rotor shaft 3. When the change shaft 4 is rotated, the rotor shaft 3 rotates together and the rotor 5 formed integral with the rotor shaft 3 rotates within the position sensor 1, whereby the moving contact 32 provided on the rotor 5 switches contact with the fixed contacts 34 provided on the board 33 within the casing 30.

The fixed contacts 34, as shown in FIG. 8, are arranged on a common circular arc while positioned corresponding to each of the shift positions. In this embodiment, on the forward movement side there are four positions such as D-position, D3-position, 2-position (second position) and 1-position (low position) in the order from a neutral position "N". The fixed contacts 34 corresponding to these positions have a predetermined length and there are clearances between the neighboring fixed contacts 34. In addition, each of the positions is located on a center of each of the corresponding fixed contacts.

The rotor 5 is rotated around the axial center "O" of the change shaft 4, and the moving contact 32 moves selectively with respect to each of the fixed contacts 34. When the moving contact 32 comes in sliding contact with one of the fixed contacts, the position corresponding to one fixed contact becomes ON. When the moving contact 32 leaves the fixed contact, the position becomes OFF. These ON and OFF signals are transmitted to a CPU of the vehicle via a signal line from the coupler 7. By the way, in this embodiment, the coupler 7 is connected to the controlling section 9 so that the ON and OFF signals are transmitted as a position signal to the controlling section 9.

The range within which each of positions turns ON is determined by the rotation angle of the rotor 5. In the case where the center of the N-position is 0°, when the rotor is rotated α1 in the left direction, an R-contact turns ON and the condition is maintained up to α2. When the rotor passes α2, the R-contact turns OFF. Then, a P-contact becomes ON in the range of α3 to α4.

Further, when the rotor is rotated β1 in the right direction, a D-contact turns ON and the condition is maintained up to β2. Then, a D3-contact becomes ON in the range of β3 to β4. Also, a 2-contact (second contact) becomes ON in the range of β5 to β6. Moreover, a 1-contact (low contact) becomes ON in the range of β7 to β8.

Figure 9:
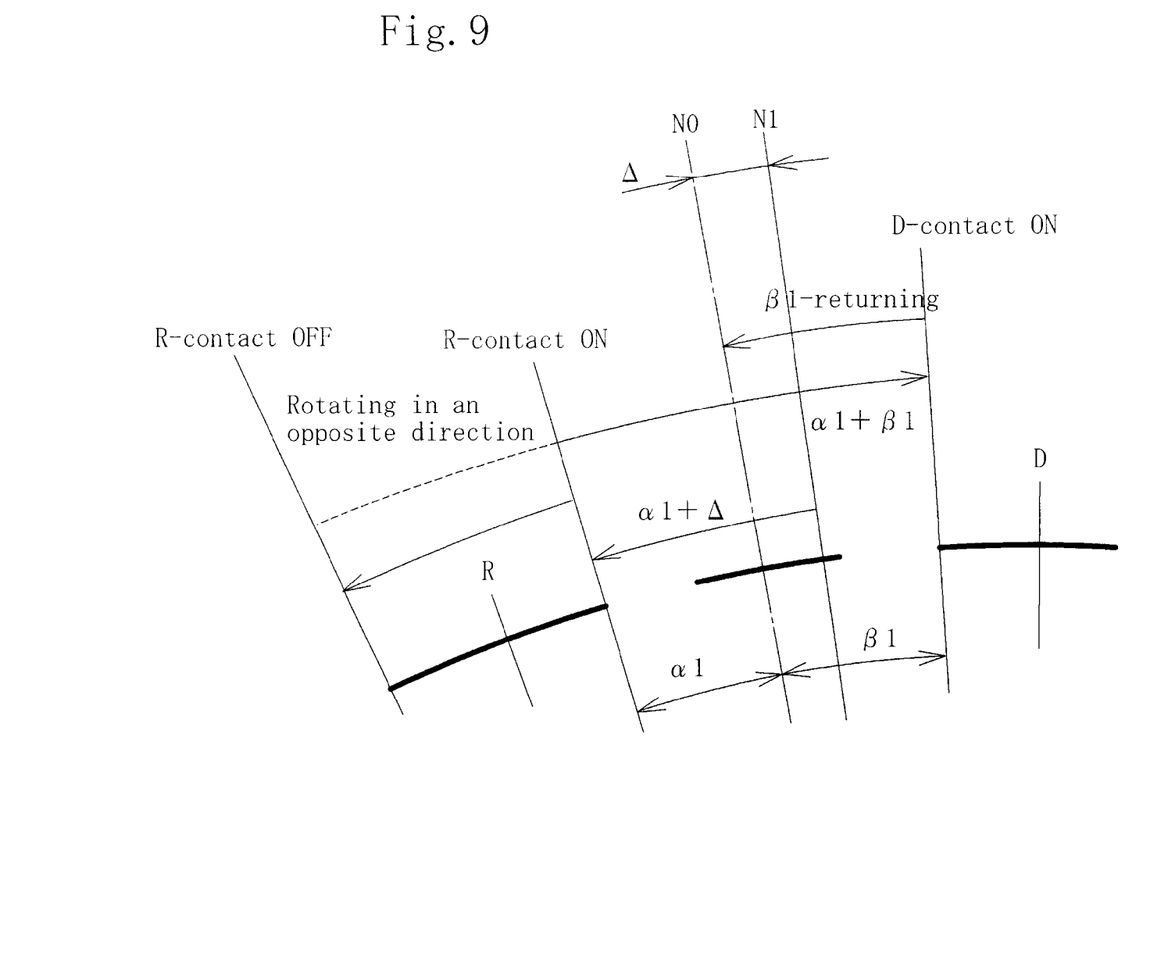
FIG. 9 is a principle explanatory view of position correction.

Next, the principle of angle ensured mounting will be explained hereunder. FIG. 9 is an enlarged, schematically explanatory view of a portion of FIG. 8. When the proper neutral position is N0, a hypothetical neutral position is N1 in the case of positioning and actually setting the position sensor 1 on the automatic transmission. Then, it is supposed that N1 has slipped as much as Δ off N0 to the right. By the way, N1 is such a state (hereinafter, referred to as initial state) that the position sensor is positioned by means of the positioning section 12, and the slippage of the order of Δ may be caused through various factors such as machining accuracy, assembling accuracy, etc.

In this initial state, the controlling section 9 has the sensor rotation shaft 18 rotated in the clockwise direction in the drawing through the servo motor 15 so as to rotate the position sensor 1 in the same direction so that the rotation angle from the point when the N-contact turns OFF to the point when the R-contact turns ON is detected. This rotation angle is $\alpha 1+\Delta$. Then, the position sensor 1 continues rotating until the R-contact reaches OFF (i.e. up to $\alpha 2$) and the rotation is stopped when the R-contact turns OFF.

Next, the position sensor 1 is rotated in the opposite direction until the D-contact turns ON, so that the angle from the point ($\alpha 1$) when the R-contact turns OFF after turning ON to the point when the D-contact turns ON is measured. This angle is $\alpha 1+\beta 1$. From the result of this measurement, the N0 position to be adjusted is operated through the controlling section 9. Since the $\alpha 1$ and the $\beta 1$ are previously stored as a preset value in a memory in the controlling section 9, a correction value $\Delta$ is calculated based on the initially measured value $\alpha 1+\Delta$. However, since the actual stopped position is $\beta 1$, the N0 position is adjusted to a position returned as much as the angle $\beta$ from the actually stopped position, and the slippage of the amount of $\Delta$ is also corrected. Therefore, when the controlling section 9 has the servo motor 15 operated to be returned as much as $\beta 1$ from the actual position thereby rotating and correcting the position sensor 1 to the N0 position, the position sensor 1 is corrected from the initial N1 position to the proper N0 position. Then, when the bolt 6a is fastened in this corrected state, the mounting of the position sensor 1 is completed.

At this time, through adjusting the position sensor 1 to the proper N0 position, the angle ensuring of $\alpha 1$ and $\beta 1$ is performed and at the same time the electrical connection checking of each of the contacts N, R and D is completed. However, since the range within which the position sensor 1 is rotated is restricted by the breadth of the oblong hole 6a of the present invention, the electrical connection checking with respect to other contacts is performed separately. Meanwhile, in the case where a tentative fastening by the bolt 6b is not performed, it is possible to perform the simultaneous electrical connection checking of all the contacts.

Figure 10:
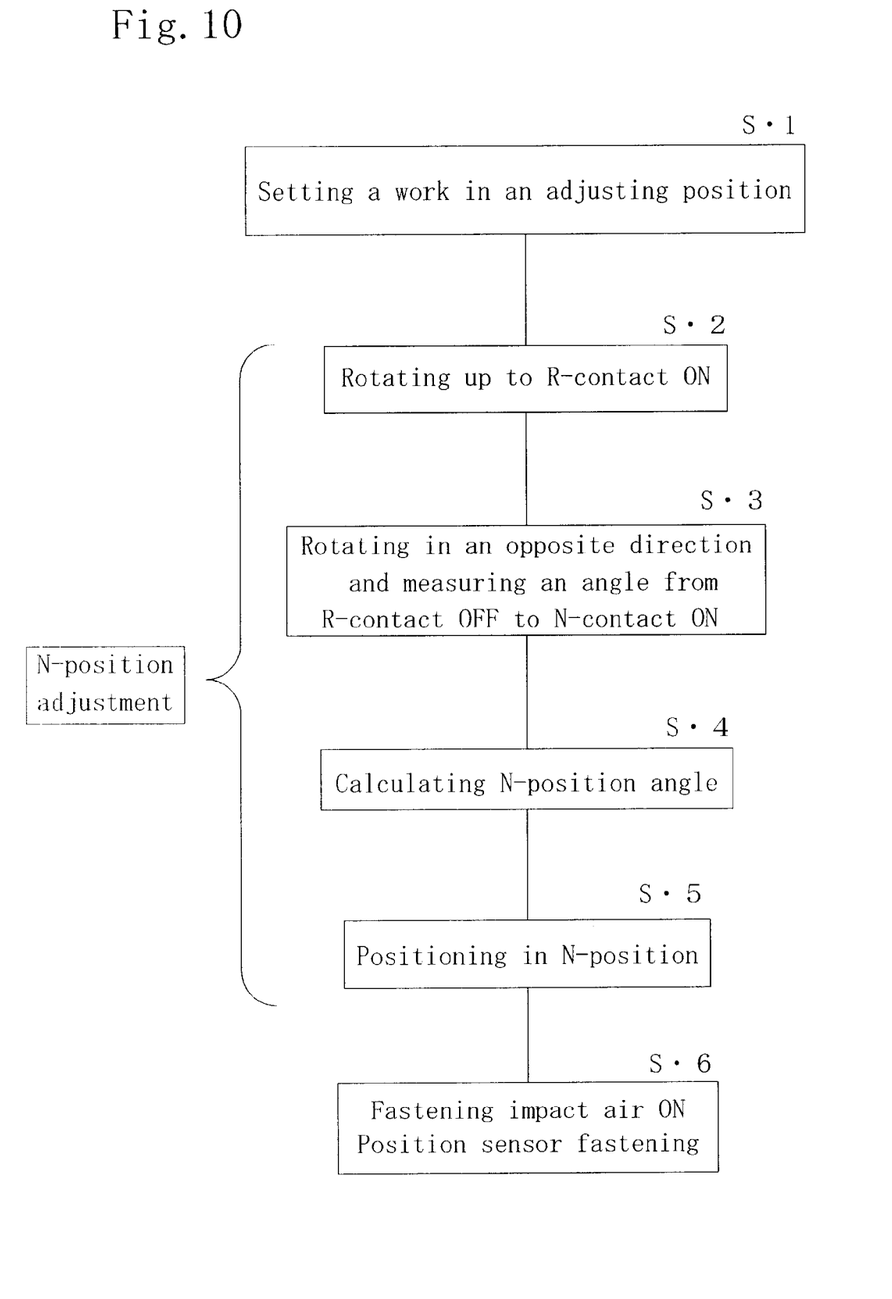
FIG. 10 is a flow chart of positioning and mounting operation.

Hereinafter, the position sensor mounting process will be explained with a control flow chart of the controlling section 9 shown in FIG. 10 as the central figure, wherein steps S·1~S·5 in the flow chart of FIG. 10 are control flows of the controlling sections 9.

First, as shown in FIG. 1 and FIG. 3, the change shaft 4 of the automatic transmission 8 is fitted into the rotor shaft 3 of the position sensor 1 so as to be set in the predetermined position, so that the automatic transmission 8 is tentatively fastened by inserting the bolts 6b into the oblong hole 6a of the mounting protrusions 6. This tentative fastening is such a loosely fastening state of the bolts 6b that the position sensor 1 is prevented from falling off while it can be freely rotated through the positioning tool 10.

In this state, the positioning tool 10 is mounted on the position sensor 1, then, as shown in FIG. 2 and FIG. 7, the engaging projection 25a of the rotor fixing section 17 is engaged with the angular opening 38 of the change shaft 4, and the positioning projections 22~24 are engaged with the positioning grooves 26~28 of the position sensor 1, so that the position sensor 1 is positioned substantially in the neutral position (S·1).

Next, the positioning section 12 is rotated by the driving section 11 so as to have the position sensor 1 rotated until the R-contact turns ON. At that time, since the position sensor 1 is fixed through the engagement between the change shaft 4 and the connecting projection 25a, the rotor shaft 3 remains immobile while the side of the fixed contacts 34 (position sensor 1) is rotated around the rotor shaft 3.

When the R-contact turns ON, the rotation angle $\alpha 1$ from the initial tentative fastening position on the N-contact to the ON position of the R-contact is detected by the encoder section 14. Thus, the angle $\alpha 1$ from N to R is obtained. At the same time, the servo motor 15 is rotated in the opposite direction (S·2).

When the D-contact turns ON, the rotation of the servo motor 15 is stopped, and the rotation of the driving shaft 18 is stopped through the brake section 13. The encoder section 14 measures the angle (corresponding to $\alpha 1+\beta 1$) from the OFF position of the R-contact to the ON position of the D-contact (S·3).

Through the above, the neutral position at the present time is measured, and a difference from a setting value is operated (S·4).

Then, when the servo motor 15 is moved as much as an amount of this error, the position sensor 1 is rotated from the present position to the neutral position of the setting value thereby being positioned in the proper neutral position (S·5). At that time, the rotation of the position sensor 1 is properly performed with high accuracy by means of the servo motor 15 and the brake section 13.

Thereafter, when the bolts 6b are fastened tightly in the two mounting protrusions 6, the position sensor 1 is properly positioned and mounted in the neutral position (S·6). Moreover, since in this state the angle ensuring and the partial electrical connection checking (in relation to the N-contact, the R-contact and the D-contact) are completed, it is not necessary to perform another angle ensuring operation as well as re-positioning and re-fastening operations, whereby the working efficiency is improved.

While the invention has been described in its preferred form, it is to be understood that the present invention is not limited to each of the above referred embodiments but may be otherwise variously modified and applied within the scope and sprit of the invention.

For example, in the above embodiment, the rotation angle from the "N" to the "R" is first measured and thereafter, the rotation angle from the "R" to the "D" is measured. However, since the $\alpha 1$ and the $\beta 1$ are prescribed values, when the first angle from the "N" to the "R" is measured so as to have the $\alpha 1+\Delta$ detected, the correction value $\Delta$ is able to be determined. Accordingly, at this time point, when the position sensor 1 is rotated in the opposite direction, it is possible to position the position sensor 1 in the proper N-position thereof. Further, at this stage, the angle ensuring with respect to the $\alpha 1$ and the $\beta 1$ is completed. In this case, all that is required is the rotation to one side (R-side), so that the positioning operation is able to be most shortened. In addition, when the $\beta 1$ is measured by rotating the position sensor 1 first to the D-side opposite to the R-side, the same result may be obtained.

Further, while the angle ensuring is performed using the rotation angle from the N-position to the ON positions of the neighboring R- and D-contacts, it is possible to use the rotation angle to the center position or OFF position or the like of each of the contacts according to circumstances. Furthermore, reversing the positional relation between the positioning projections 22~24 and the positioning grooves 26~28, it is possible to provide the positioning projections 22~24 on the position sensor 1 and the positioning grooves 26~28 on the positioning section 12.

What is claimed is:

1. A positioning device for positioning a position sensor for an automatic transmission in a neutral position at a time of mounting the position sensor on the automatic transmission, in which in accordance with a rotation angle of a rotor, a moving contact of the rotor switches contact with a plurality of fixed contacts corresponding to each of shift positions, comprising:
- a positioning section configured to perform the positioning of the position sensor,
- a driving section configured to rotate the position sensor through the positioning section,
- a rotation angle detecting section configured to detect a rotation angle of the position sensor, and
- a controlling section configured to control an operation of the driving section,
- wherein the driving section is configured to be operated to rotate the position sensor which is positioned in the positioning section in a state of stopping the rotation of the rotor,
- wherein the rotation angle detecting section is configured to detect a rotation angle from a neutral position to a predetermined position of a neighboring shift position,
- wherein the controlling section is configured to calculate, based on this detected value, an angle of a proper neutral position, and
- wherein the driving section is configured to be re-operated to rotate and correct the position sensor to the proper neutral position.

2. The positioning device of the position sensor according to claim 1, wherein the driving section comprises:
- a servo motor,
- a speed reducing section configured to reduce a rotation output of the servo motor,
- a driving shaft to which the driving force from the speed reducing section is transmitted,
- a brake section configured to brake the rotation of the driving shaft, and
- the rotation angle detecting section.

3. The positioning device of the position sensor according to claim 2, wherein the speed reducing section comprises a harmonic drive gearing.

4. The positioning device of the position sensor according to claim 1 wherein the positioning section has a positioning projection or groove to be engaged with the position sensor.

5. The positioning device of the position sensor according to claim 1, wherein the position sensor is configured to be rotated from the neutral position to one of a reverse position and a drive position which neighbor the neutral position on right and left sides thereof, to measure a rotation angle from the neutral position to a contact ON position, and then the position sensor is configured to be rotated from the neutral position to the other of the reverse position and the drive position so as to measure a rotation angle from the neutral position to a contact ON position, so that a calculation of the proper neutral position and an angle ensuring between the neutral position and each of the reverse position and the drive position are performed simultaneously.

* * * * *